Jan. 7, 1964   P. E. CAMPBELL   3,116,787
HEAT EXCHANGE APPARATUS FOR EXTRUDED PRODUCTS
Filed Oct. 14, 1960   2 Sheets-Sheet 1
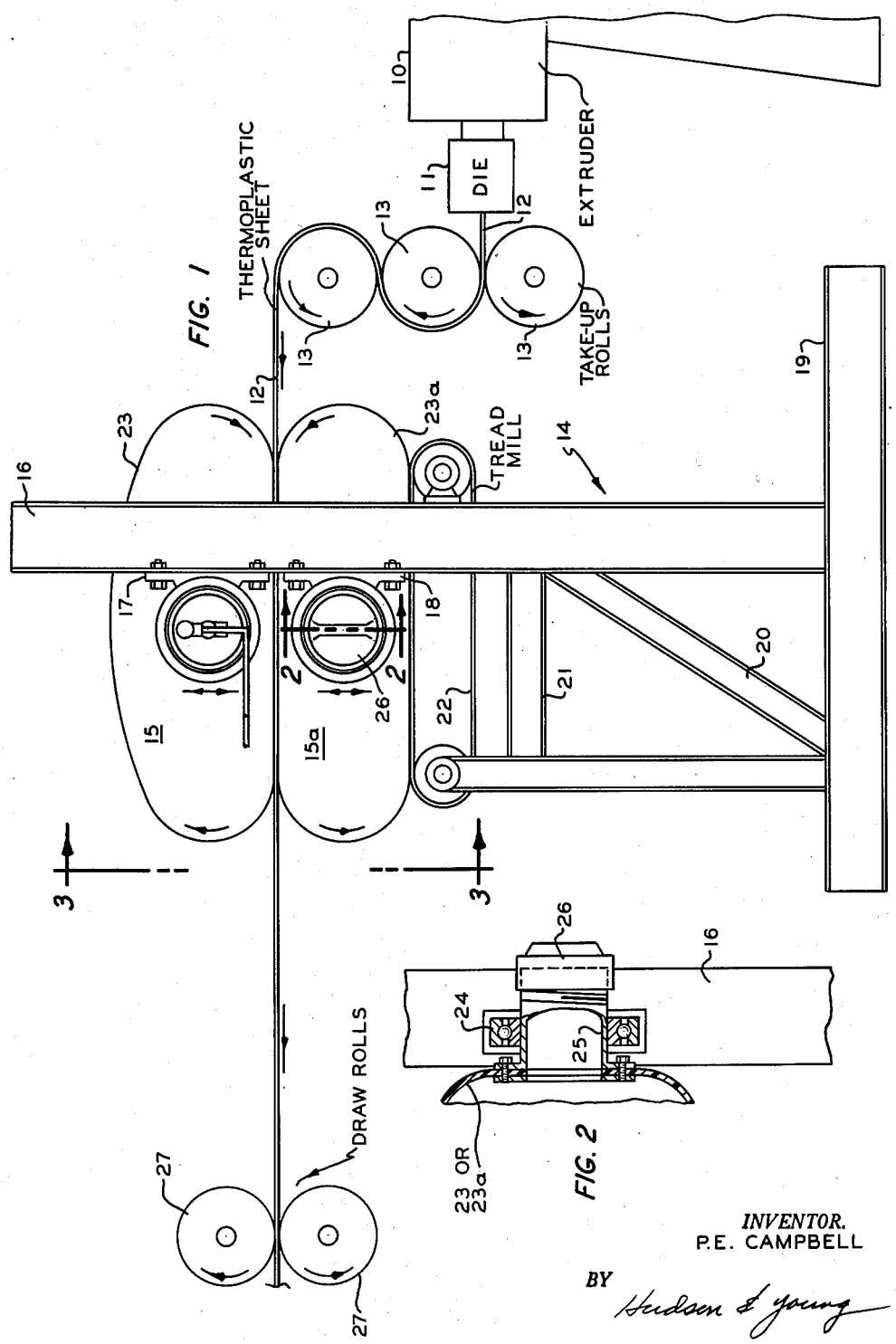
INVENTOR.
P.E. CAMPBELL
BY
Hudson & Young
ATTORNEYS

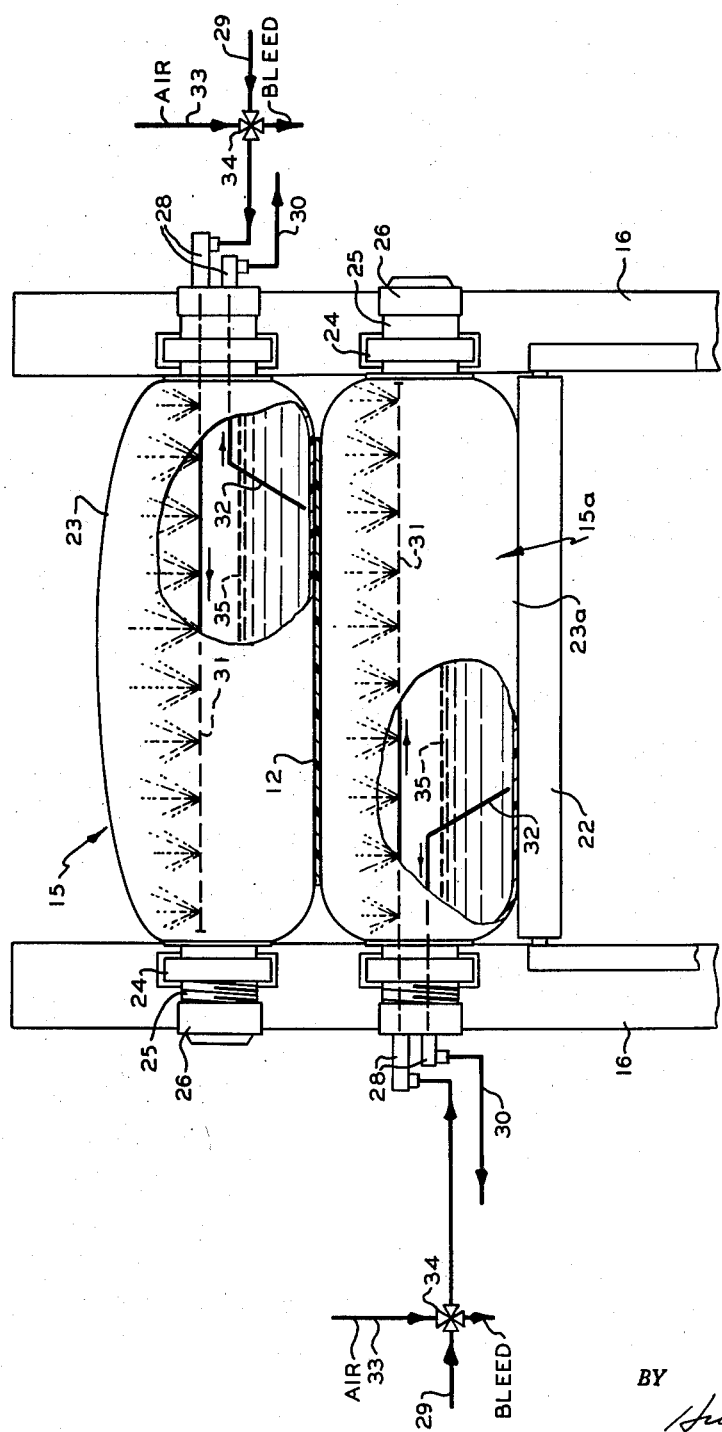

United States Patent Office 3,116,787
Patented Jan. 7, 1964

3,116,787
HEAT EXCHANGE APPARATUS FOR EXTRUDED PRODUCTS
Paul E. Campbell, Bartlesville, Okla., assignor to Phillips Petroleum Company, a corporation of Delaware
Filed Oct. 14, 1960, Ser. No. 62,690
5 Claims. (Cl. 165—90)

This invention relates broadly to improvements in the manufacturing of molded and extruded thermoplastic products or articles, for example, sheets, films, tubes and the like. In accordance with one aspect, this invention relates to an improved apparatus for the production of molded or extruded thermoplastic products. In another aspect, it relates to a heat exchange apparatus having flexible surfaces adapted to heat or cool various shaped thermoplastic products without modification of the heat exchange apparatus when processing or heat exchanging any shape of the product.

It is known to extrude thick sheets as well as hollow articles from organic plastic materials, commonly known as "plastics," by extruding the material in plastic form through an extrusion nozzle to form the desired shaped article of the plastic material, and, after the article has been formed, the extruded article is generally subjected to heat exchange, normally cooling, to cool the product for further use. Because of the poor thermal conductivity of polyolefins, particularly polyethylene, cooling molded or extruded articles is quite difficult and very often is the controlling factor in production rate. This is particularly true in thick sheet production. Ordinarily, complicated designs and numbers of cooling units are used. The present invention relates to an improved heat exchange apparatus adapted to conform substantially with the contour of thermoplastic products or articles regardless of the shape, thereby facilitating heat exchange with the product.

Accordingly, an object of this invention is to provide an improved heat exchange apparatus for heating or cooling thermoplastic articles.

Another object of this invention is to provide an improved heat exchange apparatus adapted to conform with the contour of thermoplastic products subjected to heat exchange with said apparatus.

A further object of this invention is to provide an efficient heat exchange apparatus for rapidly cooling thick sheets of thermoplastics.

Other objects, aspects as well as the several advantages will become apparent to those skilled in the art from a study of the accompanying disclosure, drawings and the appended claims.

In accordance with the present invention, thermoplastic products or articles of varying shapes and sizes to be heat exchanged, especially cooled, are passed between revolving flexible heat exchange rolls adapted to contact a substantial portion of the surface of the product passed therethrough, regardless of shape. The rolls are inflated with a fluid under pressure and are at least partially filled with a heat exchange fluid, for example, a coolant. I have found that thermoplastic articles of varying shapes and sizes can be quickly cooled in accordance with the invention since a large portion of the surface of the article being subjected to heat exchange is intimately contacted with the flexible heat exchange surfaces of the revolving rolls. Furthermore, the apparatus of my invention is quite useful in the thermoplastic processing field since it can be used for sheet, pipe, profiles or other thermoplastic products with no change or alteration in the construction of the heat exchange apparatus since the flexible surfaces of the apparatus conform substantially to the contour of the product being heat exchanged, regardless of shape.

As indicated above, the present invention is useful broadly for heat exchange, that is cooling or heating of thermoplastic articles or objects. However, in a preferred embodiment of the invention, the apparatus is utilized to cool extruded thermoplastic articles. The flexible rolls of the invention can be internally cooled with any desired coolant, for example, cold water, ice and water, liquid refrigerants, and the like. If the apparatus is to be utilized for heating then a warm heat exchange fluid is passed through the rolls. The rolls can be inflated with any suitable gaseous medium under pressure, such as air, so that they may assume different cross-sectional sizes. Also the rolls are sufficiently inflated so that they exert pressure against the article passing between the rolls. The walls of the rolls can be made of any suitable stretchable material, for example, rubber.

The present invention is adaptable for heat exchanging articles formed from substantially all of the normally solid polymers, resins, and plastics, including polystyrene and polyolefins, especially polyethylene. In general, any solid polymer of an aliphatic mono-1-olefin can be used within the scope of this invention. Examples of such starting materials include polymers and copolymers of aliphatic mono-1-olefins such as ethylene, propylene, butene-1, hexene-1, octene-1, and the like. Polymers of aliphatic mono-1-olefins having up to about 8 carbon atoms per molecule provide products having particularly desirable properties.

The polyolefins, especially polyethylenes, that can be employed in the practice of the present invention can be prepared by any of the methods which are usually employed for the preparation of these polymers including any of the well known low pressure or high pressure polymerization methods.

A better understanding of my invention will be obtained upon reference to the accompanying drawings which show a preferred embodiment of my improved apparatus for cooling a thick sheet of a thermoplastic resin obtained by extrusion.

FIGURE 1 shows diagrammatically a side elevation of the cooling apparatus in combination with an extruder, die, take-up rolls, and draw rolls for cooling a thick sheet of polyethylene.

FIGURE 2 shows in cross section the end of one of the heat exchange rolls.

FIGURE 3 shows diagrammatically two heat exchange rolls, partially cut away, with a sheet of thermoplastic resin between the rolls, and a preferred embodiment for introducing inflation gas and coolant into the rolls.

Referring now to FIGURE 1, a thermoplastic mass, for example polyethylene, is introduced into extruder 10, wherein it is heated above its softening point and masticated and then continuously forced through die 11 to form a thick polyethylene sheet 12. The polyethylene sheet is removed from die 11 by cooling rolls 13, which act as guide rolls to the extrudate as it issues from the die. The thermoplastic sheet 12 is then passed through the heat exchange apparatus of the invention generally designated numeral 14. Thermoplastic sheet 12 is pulled between revolving flexible heat exchange rolls 15 and 15a by draw rolls 27, which apply tension to the extrudate.

Hollow flexible rolls 15 and 15a are positioned one above the other and the inflation gas and coolant within the rolls exert pressure on the thermoplastic material being passed between rolls 15 and 15a through surfaces 23 and 23a. Rolls 15 and 15a are provided with hollow axles which communicate with the interior of the rolls for introduction of an inflation medium and circulation of heat exchange fluid. Rolls 15 and 15a are connected to support frame 16 by way of vertically adjustable connections 17 and 18. Vertical support members 16 are secured to base member 19 and braces 20 and 21. A tread mill is provided below roll 15a to hold roll 15a against thermoplastic sheet 12. Rolls 15 and 15a are formed of a flexible or stretchable material 23 and 23a, for example, rubber. The ends of rolls 15 and 15a are connected to adjustable connections 17 and 18 through a bearing 24 and a solid hollow shaft or hub 25, as shown in FIGURE 2. Flexible or stretchable material 23 and 23a is connected through a fluid-tight connection to the hollow shaft 25. A threaded cap 26 covers hollow shaft 25 and provides an access opening for introduction of ice or other solid coolant within the rolls, if desired.

Referring now to FIGURE 3, a coolant medium, for example cold water, is introduced into rolls 15 and 15a through pipe 29 connected to joint 28, which communicates with the interior of rolls 15 and 15a. The cold water is distributed onto flexible surfaces 23 and 23a within the rolls by any suitable means, such as spray headers 31 to contact and cool these surfaces. Coolant 35 is withdrawn from rolls 15 and 15a by way of pipes 30 and 32. Compressed air or other inflation gas is introduced into the interior of rolls 15 and 15a along with coolant by conduit 33 and valve 34. The pressure is maintained within rolls 15 and 15a at a desired level so as to press the stretchable surfaces 23 and 23a against the surfaces of the article being cooled.

As indicated above, flexible rolls 15 and 15a are hollow and formed of a relatively thin flexible material which conforms to the contour of the article being heat exchanged between the rolls. It has been found that these rolls provide very advantageous means which permit relatively quick temperature control applied to the article being subjected to heat exchange. Since rolls 15 and 15a are hollow and provided with suitable means for either heating or cooling the flexible surfaces of the rolls, by this design I am able to adjust the temperature applied to the article passing between the rolls, which revolve freely on their axes with a minmum of frictional resistance, at will by introducing either a heating or cooling medium within the rolls.

While preferred embodiments of this invention have been disclosed, the description is intended to be illustrative only and it is to be understood that changes and variations can be made without departing from the spirit and scope of the invention as defined by the appended claims.

I claim:
1. A cooling apparatus for thermoplastic materials which is capable of cooling shaped thermoplastic items without altering the configuration thereof which comprises, in combination, at least two hollow expandible rolls of a flexible material which are so adapted as to be capable of deforming so as to conform to the configuration of the shaped thermoplastic item, said rolls further being capable of deforming so as to provide a maximum surface of each roll in contact with the shaped item to be cooled, said rolls mounted to revolve freely about their axes and in contact with each other, means to introduce a first fluid medium into said rolls in order to vary the cross-sectional dimensions thereof thereby altering the surfaces of said rolls in contact with the shaped item to be cooled, means communicating with the interior of said rolls to provide a circulating flow of a second fluid medium to remove heat from the expanded flexible rolls, and means to cause said molded item to be moved between said rolls thereby causing said rolls to revolve in heat exchange relationship with said shaped thermoplastic item.

2. The cooling apparatus of claim 1 wherein said flexible material is rubber and a support member is provided revolving in contact with a surface of the rolls.

3. In an apparatus for extruding thermoplastic materials into various shaped products and wherein the extruded product is subsequently cooled, the improvement comprising a cooling apparatus adapted to cool any extruded shape without altering the cooling apparatus, said cooling apparatus comprising, in combination, at least two hollow expandible rolls of a flexible material which are so adapted as to be capable of deforming so as to conform to the configuration of an extruded shape, said rolls further being capable of deforming so as to provide a maximum surface of each roll in contact with the extruded shape, said rolls mounted to revolve freely about their axes and in contact with each other, means to introduce a first fluid medium into said rolls in order to vary the cross-sectional dimensions thereof thereby altering the surfaces of said rolls in contact with the extruded shape to be cooled, means communicating with the interior of said rolls to provide a circulating flow of a second fluid medium to remove heat from the expanded flexible rolls, and means to cause said extruded shape to be moved between said rolls thereby causing said rolls to revolve in heat exchange relationship with said extruded shape.

4. The apparatus of claim 3 further characterized in that said rolls are positioned one above the other and adjustably connected to a support frame, and a revolving support member is provided in contact with the lower surface of the bottom roll to support said roll.

5. The apparatus of claim 4 further characterized in that said means for introducing coolant to said rolls is adapted to spray coolant onto a substantial portion of the interior surfaces of said rolls.

References Cited in the file of this patent

UNITED STATES PATENTS

| | | |
|---|---|---|
| 2,452,884 | Werner | Nov. 2, 1948 |
| 2,567,704 | Grimes | Sept. 11, 1951 |
| 2,673,168 | Pascoe et al. | Mar. 23, 1954 |
| 2,722,255 | Townsend | Nov. 1, 1955 |
| 2,772,075 | Mayer | Nov. 27, 1956 |
| 2,915,292 | Gross | Dec. 1, 1959 |
| 2,970,339 | Hausman | Feb. 7, 1961 |

FOREIGN PATENTS

| | | |
|---|---|---|
| 217,384 | Australia | Aug. 1, 1957 |
| 480,699 | Great Britain | Feb. 25, 1938 |